(12) United States Patent
De Freitas et al.

(10) Patent No.: US 8,418,961 B2
(45) Date of Patent: Apr. 16, 2013

(54) DEVICE FOR SUPPORTING A DOOR WHICH IS PIVOTABLY RECEIVED IN A FUSELAGE AIRFRAME OF AN AIRCRAFT

(75) Inventors: Gastao De Freitas, Hamburg (DE); Martin Sternad, Augsburg (DE)

(73) Assignee: Airbus Operations GmbH, Hamburg (DE)

( * ) Notice: Subject to any disclaimer, the term of this patent is extended or adjusted under 35 U.S.C. 154(b) by 451 days.

(21) Appl. No.: 12/564,244

(22) Filed: Sep. 22, 2009

(65) Prior Publication Data
US 2010/0096505 A1    Apr. 22, 2010

Related U.S. Application Data

(60) Provisional application No. 61/107,116, filed on Oct. 21, 2008.

(51) Int. Cl.
*B64C 1/14*    (2006.01)

(52) U.S. Cl.
USPC .................................. 244/129.5; 16/224

(58) Field of Classification Search ............... 244/129.5; 16/224
See application file for complete search history.

(56) References Cited

U.S. PATENT DOCUMENTS

| 2,200,251 | A | * | 5/1940 | Atwood | 16/224 |
| 2,200,317 | A | * | 5/1940 | Wintercorn et al. | 16/224 |
| 4,864,690 | A | * | 9/1989 | Chen | 16/224 |
| 5,263,227 | A | * | 11/1993 | Hrbek et al. | 16/224 |
| 6,141,829 | A | * | 11/2000 | Boyer | 16/224 |
| 6,378,806 | B1 | | 4/2002 | Erben | |
| 7,578,476 | B2 | * | 8/2009 | Wiers et al. | 244/129.5 |

FOREIGN PATENT DOCUMENTS

| DE | 19730918 A1 | 1/1999 |
| DE | 19923441 C1 | 11/2000 |

OTHER PUBLICATIONS

German Office Action for DE 10 2008 043 023.4 dated Dec. 15, 2010.

* cited by examiner

*Primary Examiner* — Timothy D Collins
*Assistant Examiner* — George Andonyan
(74) *Attorney, Agent, or Firm* — Jenkins, Wilson, Taylor & Hunt, P.A.

(57) ABSTRACT

The invention relates to a device for supporting a door which is pivotably received in a fuselage airframe of an aircraft, with a counter bearing arranged in the region of a doorframe and a thrust bearing located opposite in the region of the door. According to the invention, the counter bearing has a planar counter bearing surface and the thrust bearing has a mounting in which a planar thrust bearing surface which can tilt about at least one spatial axis is received, the counter bearing surface lying against the thrust bearing surface at least in some regions when the door is closed.

Because of the thrust bearing surface which can be tilted in at least one spatial direction, the counter bearing always lies against the thrust bearing over the entire surface areas thereof, irrespective of any manufacturing tolerance deviations between the doorframe and the door or the bearing on the fuselage airframe, in such a way that optimal force transfer is ensured.

The device according to the invention is provided in particular for use in fuselage airframe with doors received therein which are primarily produced from composite materials, in particular with carbon-fiber-reinforced (CFRP) or glass-fiber-reinforced plastics materials.

8 Claims, 2 Drawing Sheets

DEVICE FOR SUPPORTING A DOOR WHICH IS PIVOTABLY RECEIVED IN A FUSELAGE AIRFRAME OF AN AIRCRAFT

CROSS-REFERENCE TO RELATED APPLICATIONS

This application claims the benefit of U.S. Provisional Application No. 61/107,116, filed Oct. 21, 2008, the entire disclosure of which is herein incorporated by reference.

FIELD OF THE INVENTION

The invention relates to a device for supporting a door which is pivotably received in a fuselage airframe of an aircraft, with a counter bearing arranged in the region of a doorframe and a thrust bearing located opposite in the region of the door.

Doors in a pressure-tight fuselage airframe of an aircraft are subject to extremely high mechanical loads, because when flying at a conventional height of 12,500 m, a cabin pressure of approximately 795.0 hPa prevails in the interior of the aircraft cabin, corresponding approximately to a height of 2,000 m above sea level, whilst a substantially lower air pressure of about 178.6 hPa prevails outside the aircraft cabin. With a surface area of 2 m² for the door leaf, for example, this pressure difference would result in a force of approximately 123.3 kN (equivalent to 13 t).

The forces occurring as a result of this pressure difference between the interior of the cabin and the surrounding atmosphere attempt to push the door outwards out of the door jamb. The conventionally used locking brackets and door mountings of the doors built into fuselage airframes are not capable of absorbing these forces on their own and transferring them into the fuselage airframe structure. Moreover, any warping of the door in flight operation must be prevented in order to avoid any leaks resulting from seals which are not completely tight.

Supports known as "doorstops" are used for this purpose. The counter bearings are fastened peripherally on the door jamb or doorframe, whilst the doorstops are arranged opposite one another on the door. When the door is closed, 14 doorstops on the door for example are supported on a corresponding number of counter bearings in such a way that the door is reliably prevented from being pushed out.

Until now, the fuselage airframes of modern aircraft have predominantly been produced using metal materials, in particular aluminium alloys. The use of metal materials in aircraft construction allows low manufacturing tolerances, because for example doorframes can be produced with greater dimensional accuracy in the milling process. The same applies to the "doorstops" which have conventionally been used thus far, which each consist of a counter bearing and a support which are likewise produced by relatively high-precision milling, so that it is possible to adapt the doorstops individually with high precision and with reasonable manufacturing costs in such a way as to achieve an optimal fit for the door.

However, the increasing use of composite materials, in particular carbon-fibre-reinforced epoxy resins, in aircraft manufacture necessarily leads to higher tolerances, because the manufacturing processes of fibre-reinforced plastics materials require greatly increased tolerances as a matter of principle. These tolerances are of particular significance as regards the integration of doors into fuselage airframes which are formed using fibre-reinforced materials.

SUMMARY OF THE INVENTION

The object of the invention is therefore to produce a device which reliably prevents a door from being pushed out of a door jamb in a fuselage airframe of an aircraft and which also allows tolerance compensation so as to enable use with fuselage airframes manufactured primarily with composite materials.

This object is achieved by a device for supporting a door which is pivotably received in a fuselage airframe of an aircraft with a counter bearing arranged in the region of a doorframe and a thrust bearing located opposite in the region of the door. The counter bearing has a counter bearing surface and the thrust bearing has a mounting in which a thrust bearing surface which can tilt around at least one spatial axis is received. The counter bearing surface lies against the thrust bearing surface at least in some regions when the door is closed.

As a result of the fact that the counter bearing has a counter bearing surface and the thrust bearing has a mounting in which a thrust bearing surface which can tilt around at least one spatial axis is received, and the counter bearing surface lies against the thrust bearing surface at least in some regions when the door is closed, dimensional differences in the doorframe, the door bearings or the door lock can be automatically compensated by an initial one-off adjustment. In this case, the thrust bearing surface is formed so as to be able to tilt relative to the counter bearing surface in at least one spatial direction. Moreover, the device makes it possible automatically to compensate dimensional differences caused by wear between the door and the doorframe. The counter bearing surface and the thrust bearing surface may have a surface geometry which is planar or curved in any desired manner.

In an advantageous embodiment, the thrust bearing surface is formed by a pendulum surface of a pendular support.

By using the known pendular supports, it is advantageously possible in the embodiment of the device according to the invention to use standardised standard parts in order to reduce the manufacturing costs. Furthermore, the pendular support, as a fully prefabricated component unit, has a pendulum surface which can tilt in two spatial directions, allowing a greater number of incorrect positions or manufacturing dimensional differences to be automatically compensated.

Alternatively, the thrust bearing surface may also be formed with a ball thrust screw, a ball which is received in the screw and flattened at least on the upper side then forming the thrust bearing surface. There is the option of using ball thrust screws in an embodiment with or without a screw head. In the embodiment of the ball thrust screw without a screw head, said screw has an internal hexagon which acts as a counter support when the screw is tightened. The ball thrust screws require less installation space than the pendular supports and can thus be used more flexibly in terms of the construction.

A development of the device provides that the pendular support is fastened in the mounting using at least one threaded nut. This embodiment results in easier and faster exchange of the pendulum bearings in the case of maintenance or repair, for example in the case of high wear.

A further advantageous embodiment of the device provides that a height of the pendulum surface in relation to the mounting can be adjusted. In this way, in addition to the pendulum surface which can be tilted in two spatial directions, it is possible to compensate for differences in height between the components, in particular between the door and the door frames.

Further advantageous embodiments of the device are disclosed in the remaining claims.

DETAILED DESCRIPTION OF THE DRAWINGS

Figure 1:
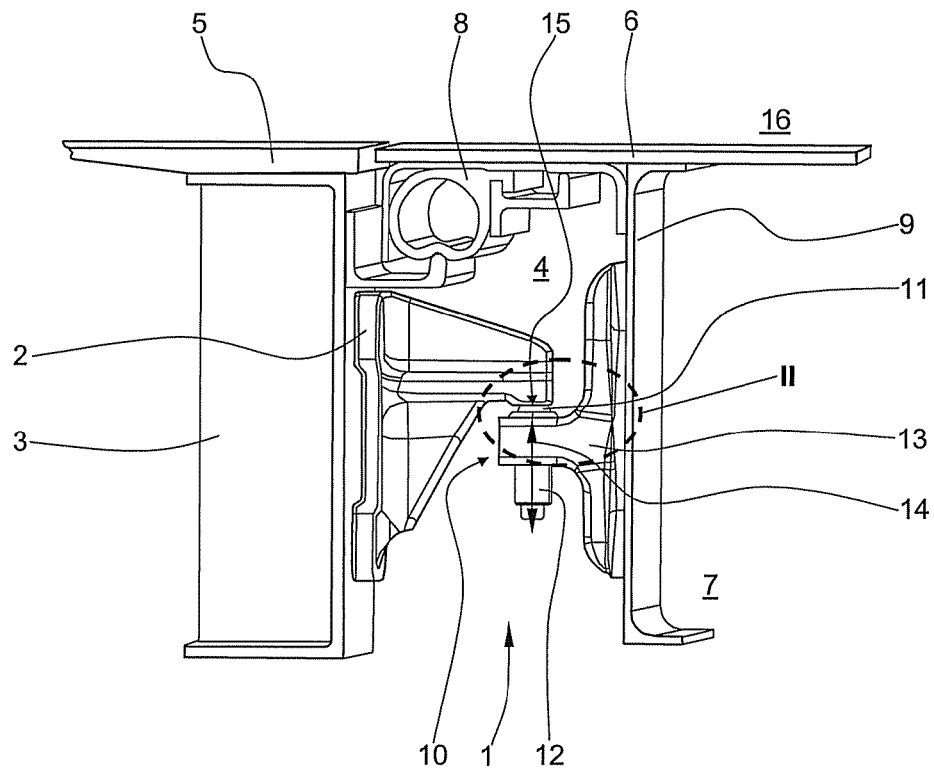
FIG. 1 is a perspective overview of the device.

In the drawing, like constructional elements have like reference numerals in each case.

FIG. 1 is a perspective view of the device.

A device 1 comprises, inter alia, a counter bearing 2 which is arranged in the region of a doorframe 3 or a door jamb of a door opening 4 in a fuselage airframe 5 of an aircraft. A closed door 6 is located in the door opening 4. The required pressure tightness of an interior 7 of the fuselage 5 is ensured, inter alia, by a peripheral seal 8 arranged peripherally on the door 6. On one lateral surface of the door 6, opposite the counter bearing 2, a thrust bearing 10 is fastened. The thrust bearing 10 has a thrust bearing surface 11 which is fixed in a mounting 13 using a threaded nut 12. The threaded nut 12 secures the spatial position of the thrust bearing surface 11, on the one hand, and provides continuous height adjustment of said surface in the direction of a black double-headed arrow 14 on the other. The threaded nut 12 is also provided with a securing means (not shown) to prevent uncontrolled detachment. The counter bearing 2 has a fixed planar counter bearing surface 15, whilst the thrust bearing surface 11 of the thrust bearing 10 can be tilted about at least one spatial axis, in particular in order to provide tolerance compensation as a result of manufacturing dimensional differences between the doorframe 3 and the door 6. This is highly advantageous in particular when using composite materials in the region of the door opening 4, because the measurement tolerances of these materials are in principle substantially greater than those of metal materials, such as aluminum or titanium alloys, and the device 1 makes it possible to achieve an optimum force transfer between the door 6 and the fuselage airframe 5 irrespective of any dimensional differences. In the closed state of the door 6 as shown in FIG. 1, the counter bearing surface 15 and the thrust bearing surface 11 ideally lie against one another over the entire surfaces thereof. For this reason, the forces resulting from the pressure differences between the interior 7 of the aircraft and the atmosphere 16 and acting on the door 6, which attempt to push the door 6 outwards with a great action of force, are transferred directly into the doorframe 3 or the fuselage airframe 5 by the thrust bearing 10 of the door 6 via the counter bearing 2. Conventionally, in the region of a door opening 4 and on the door 6 of a passenger aircraft, at least 10 to 15 doorstops, configured in accordance with the device 1, are arranged around the periphery of the door opening, preferably evenly spaced from one another.

Figure 2:
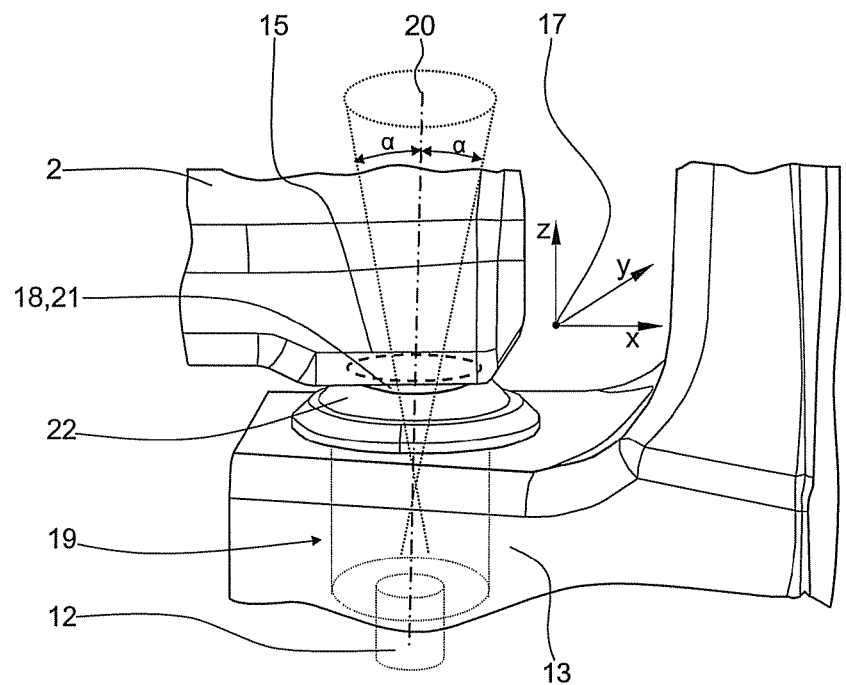
FIG. 2 is an enlarged view of a detail from FIG. 1.

FIG. 2 shows an enlarged detail of FIG. 1.

A coordinate system 17 illustrates the spatial position of all the major components. An x-axis of the coordinate system 17 is oriented in the direction of flight of the aircraft and extends parallel to the longitudinal axis of the aircraft. A z-axis of the coordinate system points vertically upwards, i.e. is directed away from the floor. An y-axis extends transverse to the longitudinal axis of the aircraft and in this case points in the "port" direction of the plane, or to the left as seen in the direction of flight.

The fixed planar counter bearing surface 15 extends parallel to the plane generated by the x-axis and the y-axis of the coordinate system 17. The same applies, at least in the rest state, to the thrust bearing surface 11, which in the embodiment shown is a pendulum surface 18 of a pendular support 19, which is received in the mounting 13. In contrast to the fixed counter bearing surface 15, the pendulum surface 18 can be tilted through an angle $\alpha$ relative to a vertical axis 20 which extends parallel to the z-axis of the coordinate system 17, as is shown by the dashed conical outline in FIG. 2. In a particularly preferred embodiment, the pendulum surface 18 is a circular surface 21, which is the result of appropriate flattening or planing of a ball 22, the flattened ball 22 being received in the pendulum support 19 so as to be able to tilt. The circular surface 21 may alternatively be formed by removing a spherical segment from the ball 22. The angle $\alpha$ is in a range of ±9° in order to provide sufficient possibility for compensation. The fastening of the pendular support 19 in the mounting 13 likewise takes place with a threaded nut 12, and this simultaneously allows the height of the pendulum surface 18 to be adjusted parallel to the z-axis of the coordinate system 17. Because the pendulum surface 18 can be tilted to all sides, contact between the counter bearing surface 15 and the pendulum surface 18 is always provided over the entire surfaces thereof when the door 6 is closed, even in the case of dimensional differences.

Instead of the pendular support 19, with a circular pendulum surface 18 which can be tilted to all sides, the thrust bearing surface 11 may also be formed with what is known as a ball thrust screw (not shown in the figures). The ball thrust screw can be fixed in the mounting 13 corresponding to the pendular support 19 by means of a threaded nut 12. In this case, the ball thrust screw may be used with a head or without a head.

Both the counter bearing surface 15 and the ball 22 are formed from a hardened, highly wear-resistant metal material. The use of the device 1 results, in addition to improved tolerance compensation possibilities, in improved wear resistance, so that the maintenance interval can be increased and costs can thus be reduced.

Figure 3:
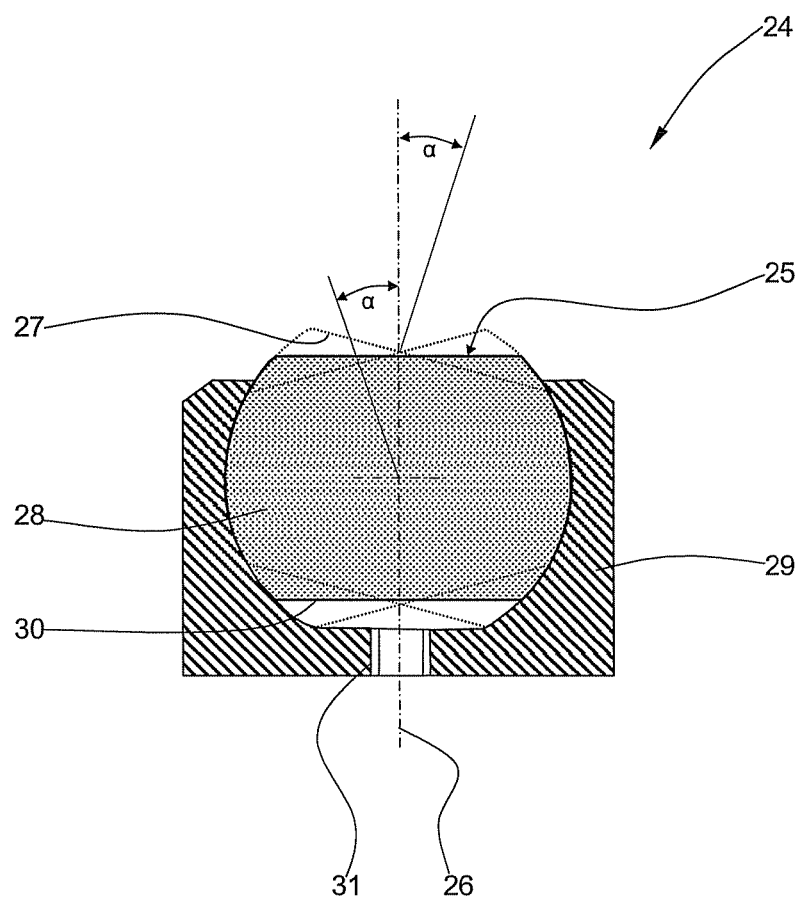
FIG. 3 is a sectional view through a pendular support.

FIG. 3 is a sectional view through one possible embodiment of a pendular support.

A pendular support 24 has a pendulum surface 25 which is pivotable through an angle $\alpha$ of approximately ±9° in relation to a vertical axis 26. The planar pendulum surface 25 is a circular surface 27 resulting from a ball 28 flattened on the upper surface, the ball 28 being received in a housing 29 so as to be movable sufficiently easily under a slight pressure closure and is simultaneously secured against falling out. Underneath, the ball 28 also has a circular flattened portion 30, in order to ensure that the ball 28 can be tilted sufficiently easily inside the housing 29. A threaded hole 31, by means of which the pendular support 24 can be fixed to a mounting by screwing in an appropriate fastening bolt, is introduced in the region of a lower side of the housing 29. At least the pendulum surface 25 is formed from an annealed steel alloy in order to reduce the susceptibility to wear. Alternatively, the ball 28 can be formed in its entirety from an annealed and preferably corrosion-resistant steel alloy. It can be seen from FIG. 3 that the pendulum surface 25 is pivotable in relation to the horizontal by an angle of $\alpha=9°$ about two spatial axes independently of one another.

LIST OF REFERENCE NUMERALS

1 Device
2 Counter bearing
3 Doorframe
4 Door opening
5 Fuselage airframe
6 Door
7 Interior (passenger cabin)
8 Seal
9 Lateral surface (door)
10 Thrust bearing
11 Thrust bearing surface
12 Threaded nut
13 Mounting
14 Double-headed arrow
15 Counter bearing surface
16 Atmosphere (exterior)
17 Coordinate system
18 Pendulum surface
19 Pendular support
20 Vertical axis
21 Circular surface
22 Ball (flattened or planed at least on one side)
24 Pendular support
25 Pendulum surface
26 Vertical axis
27 Circular surface
28 Ball (flattened or planed at least on one side)
29 Housing
30 Flattened portion (at least on one side)
31 Threaded hole

The invention claimed is:

1. A device for supporting a door which is pivotably received in a fuselage airframe of an aircraft, with a counter bearing arranged in the region of a doorframe and a thrust bearing located opposite in the region of the door, wherein the counter bearing has a counter bearing surface and the thrust bearing has a mounting in which a thrust bearing surface which can tilt around at least one spatial axis is received, and the counter bearing surface lying against the thrust bearing surface at least in some regions when the door is closed.

2. The device according to claim 1, wherein the thrust bearing surface is formed by a pendulum surface of a pendular support.

3. The device according to claim 2, wherein the pendular support is fastened in the mounting by means of a threaded nut or a threaded bolt.

4. The device according to claim 2, wherein a height of the pendulum surface in relation to the mounting can be adjusted.

5. The device according to claim 2, wherein the pendulum surface can be tilted through an angle of up to ±9°.

6. The device according to claim 1, wherein the counter bearing, the thrust bearing and/or the mounting are formed from a metal alloy.

7. The device according to claim 2, wherein the pendulum surface is a circular surface of a ball which is flattened on at least one side, the ball being received in the pendular support so as to be able to tilt.

8. The device according to claim 2, wherein the thrust bearing surface and/or the pendulum surface are hardened.

* * * * *